(12) United States Patent
Xu et al.

(10) Patent No.: US 10,625,840 B2
(45) Date of Patent: Apr. 21, 2020

(54) ARRANGEMENT OF CRYOGENIC CONTAINERS FOR LNG OR CNG ON A DECK OF A TUGBOAT

(71) Applicant: Keppel Offshore & Marine Technology Centre Pte Ltd, Singapore (SG)

(72) Inventors: Junwei Kelvin Xu, Singapore (SG); Abul Bashar Md Masum Reza, Singapore (SG); Sreekala Kumar, Singapore (SG); Aziz Amirali Merchant, Singapore (SG)

(73) Assignee: Keppel Offshore & Marine Technology Centre Pte Ltd, Singapore (SG)

( * ) Notice: Subject to any disclaimer, the term of this patent is extended or adjusted under 35 U.S.C. 154(b) by 0 days.

(21) Appl. No.: 15/770,342

(22) PCT Filed: Oct. 26, 2016

(86) PCT No.: PCT/SG2016/050524
§ 371 (c)(1),
(2) Date: Apr. 23, 2018

(87) PCT Pub. No.: WO2017/074261
PCT Pub. Date: May 4, 2017

(65) Prior Publication Data
US 2018/0312235 A1 Nov. 1, 2018

(30) Foreign Application Priority Data
Oct. 26, 2015 (SG) .......................... 10201508833W

(51) Int. Cl.
*B63H 21/38* (2006.01)
*B63H 25/16* (2006.01)
(Continued)

(52) U.S. Cl.
CPC ......... *B63H 21/38* (2013.01); *B63B 17/0027* (2013.01); *B63B 25/16* (2013.01);
(Continued)

(58) Field of Classification Search
CPC ........ B63H 21/17; B63H 21/21; B63H 21/38; B63H 25/16; B63H 25/42; B63H 25/12;
(Continued)

(56) References Cited

U.S. PATENT DOCUMENTS 8,591,273 B2 * 11/2013 Nylund ................... B63B 25/12
440/88 F
8,690,622 B2 * 4/2014 Pearson ................. B63H 25/42
440/88 F
(Continued)

FOREIGN PATENT DOCUMENTS

| DE | 202013010271 | 3/2014 |
|---|---|---|
| WO | WO2012/032219 | 3/2012 |
| WO | WO2015/067842 | 5/2015 |

OTHER PUBLICATIONS

International Search Report from EPO dated Jan. 25, 2017 for relating International Application No. PCT/SG2016/050524.
(Continued)

*Primary Examiner* — Lars A Olson
(74) *Attorney, Agent, or Firm* — Baker Hostetler

(57) ABSTRACT

The invention relates to an arrangement of one or more cryogenic tank containers for storing liquefied natural gas (LNG) or compressed natural gas (CNG) on an open deck of a tugboat. The one or more cryogenic tank containers are removably mounted on and at an aft deck area of the tugboat and are provided with means for supplying LNG or CNG to the engine of the tugboat.

24 Claims, 13 Drawing Sheets

(51) Int. Cl.
  *B63B 35/40* (2006.01)
  *B63J 2/14* (2006.01)
  *F17C 1/00* (2006.01)
  *B63B 17/00* (2006.01)
  *B63B 35/66* (2006.01)
  *F02M 21/02* (2006.01)
  *B63B 25/16* (2006.01)

(52) U.S. Cl.
  CPC .............. *B63B 35/40* (2013.01); *B63B 35/66* (2013.01); *B63J 2/14* (2013.01); *F02M 21/0218* (2013.01); *F02M 21/0221* (2013.01); *F17C 1/002* (2013.01); *F02M 21/023* (2013.01); *F17C 2205/0107* (2013.01); *F17C 2205/0111* (2013.01); *F17C 2205/0153* (2013.01); *F17C 2205/0352* (2013.01); *F17C 2221/033* (2013.01); *F17C 2223/0123* (2013.01); *F17C 2223/0161* (2013.01); *F17C 2260/038* (2013.01); *F17C 2270/011* (2013.01); *F17C 2270/0105* (2013.01)

(58) Field of Classification Search
  CPC .... B63J 2/14; B63B 35/40; F17C 1/00; F17C 1/002
  USPC .......................................................... 440/88 F
  See application file for complete search history.

(56) References Cited

U.S. PATENT DOCUMENTS

2013/0137318 A1\* 5/2013 Byun ...................... B63B 25/16
  440/88 F
2016/0096609 A1\* 4/2016 Lee ......................... B63H 21/38
  440/88 F

OTHER PUBLICATIONS

Written Opinion from EPO dated Jan. 25, 2017 for relating International Application No. PCT/SG2016/050524.
International Preliminary Report on Patentability from EPO dated Feb. 8, 2018 for relating International Application No. PCT/SG2016/050524.

\* cited by examiner

ARRANGEMENT OF CRYOGENIC CONTAINERS FOR LNG OR CNG ON A DECK OF A TUGBOAT

CROSS REFERENCED APPLICATIONS

The present application is a PCT national phase filing of PCT Application Number PCT/SG2016/050524 filed on Oct. 26, 2016, and claims priority to Singapore Patent Application No. 10201508833W filed on Oct. 26, 2015. The content of both of these applications is hereby incorporated by reference as if set forth in their entireties herewith.

TECHNICAL FIELD

The invention relates to an arrangement of one or more cryogenic tank containers for storing liquefied natural gas (LNG) or compressed natural gas (CNG) on a deck of a vessel. In particular, the one or more cryogenic tank containers are mounted onto and at an aft deck area of a tugboat and are provided with means for supplying LNG or CNG to the engine of the tugboat.

DESCRIPTION OF RELATED ART

Liquefied natural gas (LNG) or compressed natural gas (CNG) can be used as fuel for marine vessels including ships, vessels, tugboats, etc.

Compressed natural gas (CNG) typically comprises of methane, $CH_4$. CNG is usually stored and distributed in a tank with thick steel, aluminum, or composite walls at a pressure between 20-25 MPa. These tanks may be cylindrical or spherical in shape. CNG from these tanks may then be provided as an energy source whereby the CNG is burnt as fuel under atmospheric pressure.

Liquefied natural gas (LNG) comprises natural gas that is chilled to its boiling point temperature of approximately −161° C. at atmospheric pressure to reach liquefaction. In contrast to LNG, CNG's volumetric energy density is estimated to be 42 percent that of liquefied natural gas. This enables LNG to be stored efficiently in cryogenic tank containers (e.g. IMO-container). The LNG can be re-gasified (e.g. vaporized) to natural gas and used as fuel for a vessel's propulsion system.

A cryogenic tank container (e.g. IMO-container) typically comprises a vacuum-super insulated container that is designed with performance, ease of operation and safety in mind. The cryogenic tank container can store either LNG or CNG. The cryogenic tank container is designed in accordance with ISO standards, and its size and dimensions ensure that the tank container may be conveniently transported by trailers, vessels, etc. These tank containers are marinated tanks and they have to comply with International Maritime Organization (IMO) regulations and be certified according to their class.

Current bunkering operations used in transferring LNG or CNG on board a marine vessel includes ship-to-ship, shore-to-ship, truck-to-ship and portable fuel tank bunkering methods.

The ship-to-ship, shore-to-ship and truck-to-ship bunkering operations are carried out by pumping LNG or CNG from the supply vessel or shore to the receiving vessel. These bunkering operations usually take a long time to complete, ranging from 1 to 7 hours.

The portable fuel tank bunkering operation involves the transfer of portable fuel tank from supply vessel or shore to the receiving vessel. This bunkering operation usually takes a relatively shorter period of time to complete as it involves simply the swapping of filled fuel tank from the shore or supply vessel with used (or empty) fuel tank from the vessel. However, there are some drawbacks in using this bunkering method. One of which is that the fuel tanks which are placed on the open deck of a vessel will typically obstruct the view of the vessel operator which in turn restricts the operation of the vessel. This poses a bigger problem especially if the fuel tanks are placed on a smaller vessel, such as a tugboat. Furthermore, having fuel tanks containing LNG or CNG on board a vessel can be hazardous. The provision of fuel tanks containing LNG or CNG on the open deck of a vessel will have to comply with the relevant regulations governing the storage and transfer of such hazardous gases.

It is therefore desirable to provide an arrangement of fuel tank containers for storing LNG or CNG on the open deck of a vessel that seeks to address at least one of the problems described hereinabove, or to at least provide the public with an alternative choice.

SUMMARY OF INVENTION

In accordance with some aspects of the invention, an arrangement of a system for providing liquefied natural gas (LNG) or compressed natural gas (CNG) as fuel to a tugboat is provided. The arrangement comprises one or more cryogenic tank containers removably mounted on and at an aft deck area of the tugboat for storing LNG or CNG, wherein each of the one or more cryogenic tank containers has a structural frame surrounding the cryogenic tank container. The arrangement is further provided with at least one air-tight chamber provided proximate to the one or more cryogenic tank containers, wherein the air-tight chamber comprises a coupling means for removably coupling the one or more cryogenic tank containers to the air-tight chamber; a plurality of vent lines and pipelines in gas or fluid communication with the one or more cryogenic tank containers; a plurality of valves; a plurality of vents; and a transfer line for transferring LNG or CNG from the one or more cryogenic tank containers to an engine of the tugboat. The one or more cryogenic tank containers are liquid-tight cryogenic tank containers and are removably mounted on and at the aft deck area of the tugboat by a securing mechanism that allows easy mounting and removal of the one or more cryogenic tank containers to and from the tugboat, and wherein the coupling means, the plurality of vent lines and pipelines, the plurality of valves, the plurality of vents and the transfer line are all encased within the air-tight chamber.

In accordance with some embodiments of this invention, the plurality of vent lines and pipelines include a vapor return line; a vent mast pipeline, and a bunkering line for connecting the one or more cryogenic tank containers to a bunker station.

In accordance with many embodiments of this invention, the plurality of vents includes an inlet air vent for receiving air from outside the air-tight chamber; and an outlet air vent for releasing air from within the air-tight chamber into the atmosphere.

In accordance with some embodiments of this invention, the arrangement further comprises a vent collector, wherein the plurality of vent lines and pipelines are housed within the vent collector. In accordance with an embodiment, the vent collector is provided within the air-tight chamber.

In accordance with many embodiments of this invention, the vapor return line and the transfer line extends from the one or more cryogenic tank containers and into the air-tight chamber.

In accordance with some embodiments of this invention, the arrangement further comprises a vent mast riser provided on the foremast of the tugboat, wherein the vent mast riser is connected to the vent mast pipeline for releasing pressure in the cryogenic tank container into the atmosphere when the pressure within the cryogenic tank container reaches a predetermined level.

In accordance with many embodiments of this invention, the arrangement further comprises a temporary vent mast riser attached to the one or more cryogenic tank containers.

In accordance with a number of embodiments of this invention, the arrangement further comprises a sensor unit provided proximate the one or more cryogenic tank containers for detecting escaped vapor from the one or more cryogenic tank containers.

In accordance with some embodiments of this invention, wherein the plurality of valves include pressure relief valve that is provided along the vent mast pipeline that leads to the vent mast riser and an auxiliary vent valve that leads to the temporary vent mast riser.

In accordance with some embodiments of this invention, the arrangement comprises two cryogenic tank containers and two air-tight chambers, the two cryogenic tank containers are positioned parallel to one another, with each of the cryogenic tank containers removably coupled to one respective cryogenic tank container. In accordance with some other embodiments of this invention, the arrangement comprises two cryogenic tank containers and one air-tight chamber, the two cryogenic tank containers are positioned parallel to one another, with each of the cryogenic tank containers removably coupled to the air-tight chamber.

In accordance with many embodiments of this invention, wherein the air-tight chamber further comprises a spill drip tray for collecting spillage of the liquefied natural gas (LNG) from the one or more cryogenic tank containers; and a drainage line for draining spillage collected in the spill drip tray.

In accordance with some other aspects of this invention, a method of providing LNG or CNG as fuel to a tugboat is provided. The method comprises transferring one or more cryogenic tank containers having a structural frame surrounding the cryogenic tank container onto an open deck of the tugboat; removably mounting the one or more cryogenic tank containers on and at an aft deck area of the tugboat; removably coupling the one or more cryogenic tank containers to at least one air-tight chamber, wherein the air-tight chamber comprises a coupling means for removably coupling the one or more cryogenic tank containers to the air-tight chamber; a plurality of vent lines and pipelines in gas or fluid communication with the one or more cryogenic tank containers; a plurality of valves; a plurality of vents; and a transfer line for transferring LNG or CNG from the one or more cryogenic tank containers to an engine of the tugboat. The coupling means, the plurality of vent lines and pipelines, the plurality of valves, the plurality of vents and the transfer line are encased within the air-tight chamber. The method further comprises channeling the LNG or CNG stored in the one or more cryogenic tank containers to an engine room of the tugboat.

In accordance with some embodiments of this invention, wherein the plurality of valves includes a pressure relief valve that is provided along the vent mast pipeline that leads to the vent mast riser; and an auxiliary vent valve that leads to a temporary vent mast riser.

In accordance with many embodiments of this invention, the method further comprises channeling the LNG to a regasification unit provided in the engine room below the open deck of the tugboat; passing the LNG through a vaporizer unit at high pressure to convert the LNG to gaseous fuel; and supplying the gaseous fuel to the engine of the tugboat through a gas valve unit.

In accordance with some embodiments of this invention, the method further comprises storing the gaseous fuel in a buffer tank before supplying the gaseous fuel to the engine of the tugboat.

In accordance with many embodiments of this invention, the method further comprises shutting off the plurality of valves when a gas leakage is detected.

In accordance with some embodiments of this invention, the method further comprises detecting escaped vapor; shutting off the pressure relief valve that leads to the vent mast riser; and opening the auxiliary vent valve that leads to the temporary vent mast riser.

BRIEF DESCRIPTION OF DRAWINGS

Various embodiments of the invention are disclosed hereinafter with reference to the drawings, in which.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described.

Various embodiments of the invention provide an arrangement of a system for providing liquefied natural gas (LNG) or compressed natural gas (CNG) as fuel to a tugboat. The arrangement comprises one or more cryogenic tank containers removably mounted onto and at an aft deck area of a tugboat for storing LNG or CNG on the deck of the tugboat.

Figure 1:
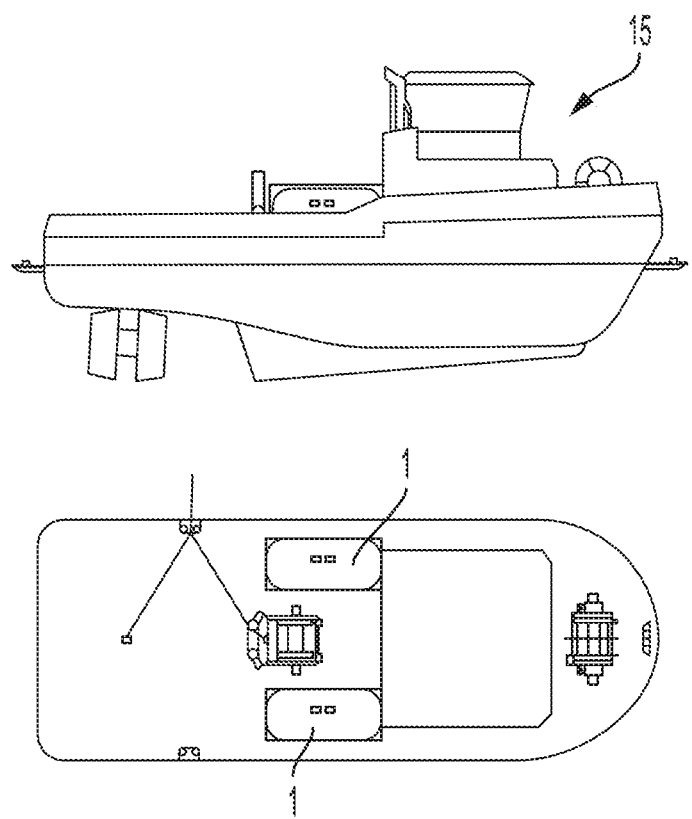
FIG. 1 illustrates an arrangement of LNG/CNG tank containers on and at an aft deck area of a tugboat in accordance with some embodiments of the invention.

FIG. 1 shows an embodiment of the present invention whereby the cryogenic tank containers (1) are provided on and at the aft deck area of a tugboat (15). In this arrangement, the cryogenic tank containers do not obstruct an operator of the tugboat during a towing operation or the visibility of the operator at the bridge of the tugboat.

The cryogenic tank containers (1) are liquid-tight cryogenic tank containers. The tank containers are standard tank containers designed in accordance with ISO standards, and its size and dimensions ensure that the tank containers can be conveniently and safely transported from one location to another by, for example, trailers, vessels, motor vehicles; and by any suitable means, for example, cranes, etc. The tank containers are IMO-containers, that is, they are made to comply with the International Maritime Organization (IMO) regulations and are certified according to their class. In one embodiment, the cryogenic tank containers are International Gas Carrier (IGC) type-C tank.

Figure 2:
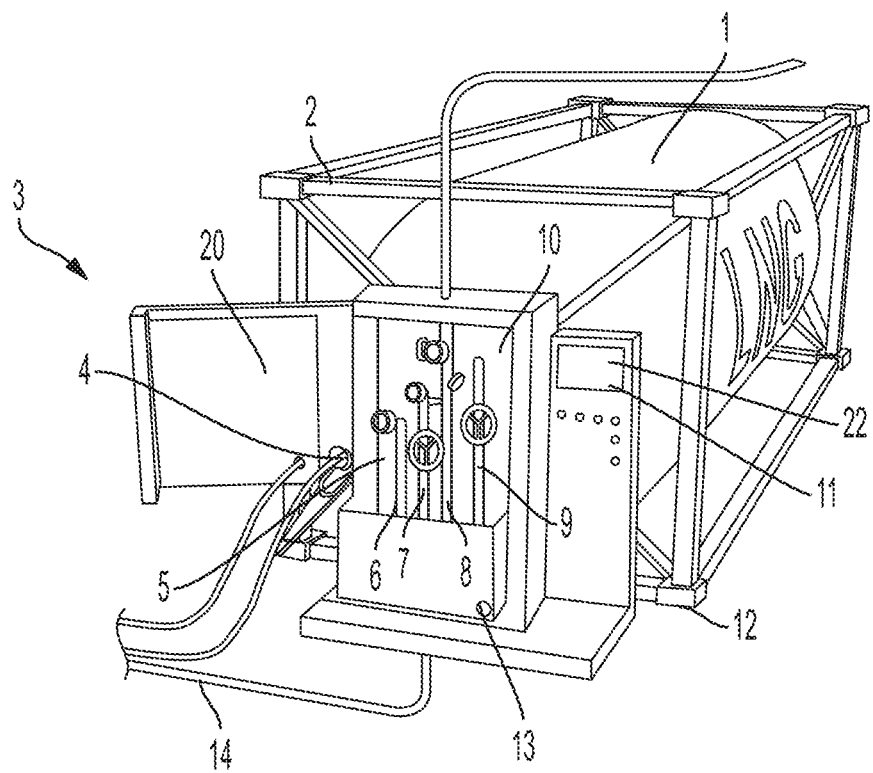
FIG. 2 illustrates the various components provided within the air-tight chamber in accordance with some embodiments of the invention.
Figure 15:
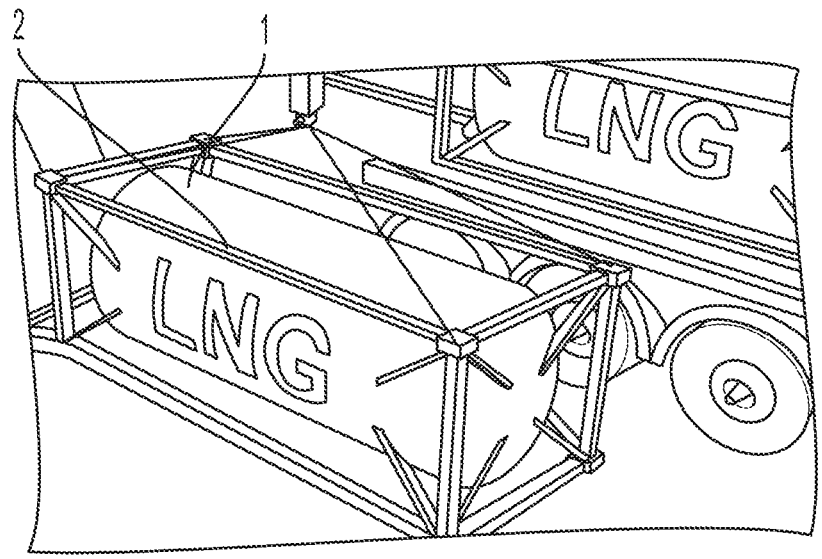
FIGS. 15-17 illustrate the transfer of the LNG/CNG tank container from shore and onto a tugboat in accordance with an embodiment of the invention.

Each of the cryogenic tank containers (1) is provided with a structural frame (2) surrounding the exterior of the cryogenic tank container. The structural frame (2) is provided to protect the cryogenic tank container against mechanical damage and to facilitate transportation of the cryogenic tank container. Any suitable configuration and design of the structural frame can be employed without departing from the scope of the present invention. For example, the structural frame can have longitudinal beams extending along a length of the cryogenic tank container, vertical beams interconnected between the longitudinal beams, horizontal beams interconnected between the longitudinal beams and diagonal beams extending from each of the corners of the structural frame to the cryogenic tank container and welded to fitting to hold the tank container in place within the structural frame. All the interconnecting beams can be joined to one another by any suitable means. In one embodiment, the beams are joined together by welding. FIGS. 2 and 15 show an exemplary configuration of the structural frame (2) in accordance with an embodiment of the present invention. The structural frame (2) has eight corners and each of the corners is provided with a corner casting (12) in accordance with ISO standard. The cryogenic tank container can be removably mounted within the structural frame or be welded to the structural frame.

Figure 3:
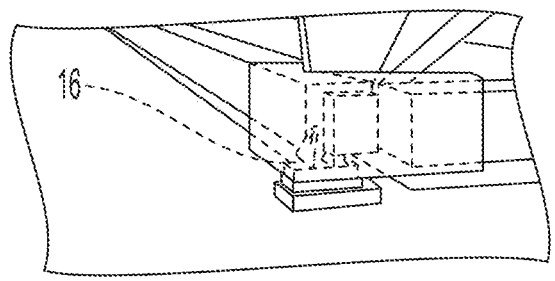
FIG. 3 illustrates a securing mechanism that is provided on the structural frame in accordance with an embodiment of the invention.

The structural frame (2) is further provided with a securing mechanism (16) to removably secure the cryogenic tank container (1) on and at the aft deck area of the tugboat. Any suitable type of securing mechanism can be used in accordance with various embodiments without departing from the scope of the present invention as long as the securing mechanism allows the tank container to be easily replaced thereby reducing the bunkering time while providing easy access for maintenance purposes. In one exemplary embodiment of the invention, the securing mechanism is a twistlock type securing mechanism that is commonly used in container ships (see FIG. 3). A twistlock is provided at each corner of the base of the structural frame (2). The twistlock and the corner casting (12) together form a rotating connector for securing the structural frame containing the cryogenic tank container onto and at the aft deck area of the tugboat. Another way of securing the cryogenic tank container to the aft deck area of the tugboat is by welding the structural frame containing the cryogenic tank container to the upper surface of the deck with or without a base platform.

Figure 4:
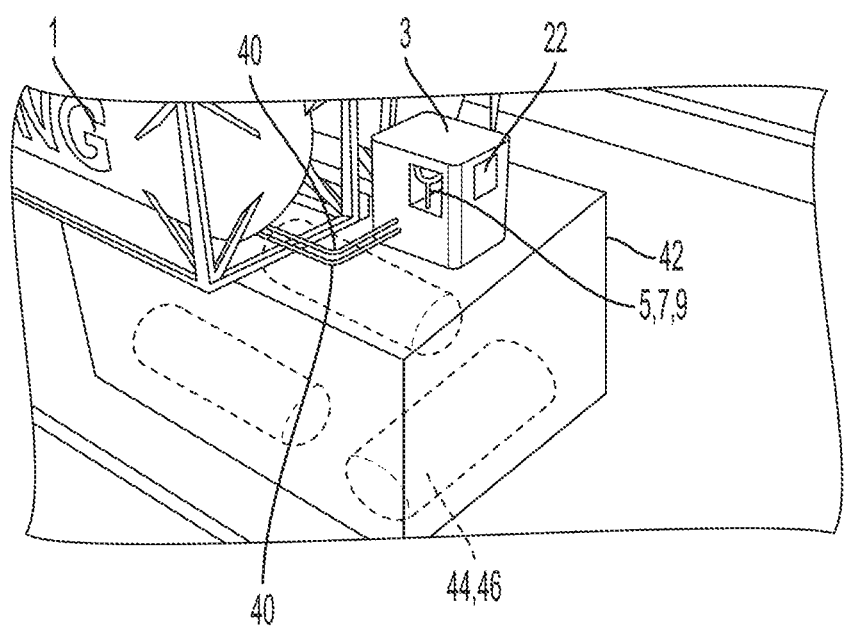
FIG. 4 illustrates an exemplary embodiment of the air-tight chamber in accordance with an embodiment of the invention.

Each of the cryogenic tank containers (1) is fitted with at least two vent lines extending from the cryogenic tank container and into an enclosed air-tight chamber (3) which will be described in more detail hereinbelow. The vent lines may include, but are not limited to, transfer line, vapor return line, pressure relief line, etc. The vapor_return line and the pressure relief line may be provided with pilot operated relief valve for releasing gas or vapor into the atmosphere when needed. The vent lines may extend from the top or the bottom of the cryogenic tank container or from any suitable part of the cryogenic tank container. FIG. 4 shows an embodiment of an arrangement of the vent lines (40) that extend from the cryogenic tank container. In accordance with the shown embodiment, the vent lines (40) extend from the lower part of the cryogenic tank container and into the enclosed air-tight chamber (3).

At least one air-tight chamber (3) is provided in the arrangement of the present invention. The air-tight chamber (3) is provided to encase all the valves, gauges, vents, vent lines, pipelines, bunkering line, etc. within the air-tight chamber. The air-tight chamber (3) is provided proximate to the one or more cryogenic tank containers removably mounted on and at the aft deck area of the tugboat to mitigate the hazardous zone area on the deck. The air-tight chamber (3) can be of any suitable shape, configuration, and size as long as the air-tight chamber is sufficient to encase the valves, gauges, vent lines, pipelines, bunkering line, etc. within the air-tight chamber. Exemplary embodiments of the air-tight chamber (3) are shown in various figures, including FIGS. 2, 4, 11, and 17. FIGS. 2 and 4 show different embodiments of the air-tight chamber (3) wherein the chamber is a box-like structure. FIG. 2 shows the various components that are encased within the air-tight chamber.

Referring now to FIG. 2, the air-tight chamber (3) comprises a door (20) and when the door (20) is shut, it creates an air-tight environment within the chamber. Within the air-tight chamber (3), there is provided a coupling means (4) for removably coupling the one or more cryogenic tank containers (1) to the air-tight chamber (3). A bunkering line (5) is provided for connecting the one or more cryogenic tank containers in fluid communication to a bunker station (now shown).

The air-tight chamber (3) further comprises a plurality of vents lines and pipelines that are in gas or fluid communication with the one or more cryogenic tank containers. In one embodiment, the plurality of vent lines and pipelines are encased within the air-tight chamber (3). In accordance with some other embodiments, the plurality of vents lines and pipelines are housed in a vent collector (50). The vent collector (50) can be located within the air-tight chamber (3) or in another enclosed air-tight compartment provided elsewhere on board the tugboat and proximate the cryogenic tank containers.

Figure 5:
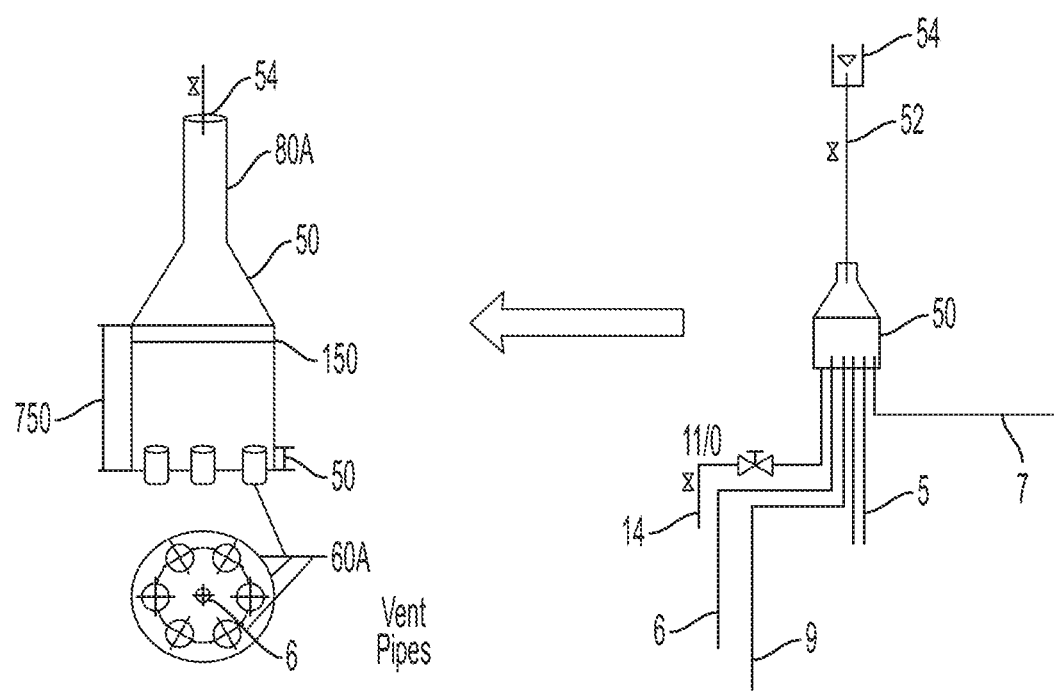
FIG. 5 is a diagram illustrating the arrangement of the vent collector and other components in accordance with some embodiments of the invention.

FIG. 5 shows an embodiment of the vent collector (50) in accordance with the present invention. It should be noted that the vent collector is not limited to the configuration shown in the figure. The vent collector can be of any suitable size, shape and configuration without departing from the scope of the present invention. Referring to FIG. 5, the vent collector (50) comprises a conduit (52) that extends from the vent collector (50) to a vent mast riser (54). The vent collector (50) is provided to facilitate the channeling of vapor or gas from the vent lines and pipelines to the vent mast riser (54) to be released into the atmosphere.

Referring back to FIG. 2, the air-tight chamber may further comprise a plurality of valves, gauges and vents which are encased within the air-tight chamber. The vents may include an inlet air vent (10) and an outlet air vent (6). The inlet air vent (10) and the outlet air vent are provided to provide ventilation for the air-tight chamber. The inlet air vent (10) is for receiving fresh air from non-hazardous safe zone outside the air-tight chamber while the outlet air vent (6) is for releasing air from within the air-tight chamber into the atmosphere. In accordance with some alternative embodiments, the outlet air vent (6) includes a pipeline that channels the air from within the air-tight chamber away from the air-tight chamber.

The plurality of vent lines includes the vapour return line (7) that extends from the cryogenic tank container and into the air-tight chamber (3). The vapor return line (7) is provided in the event that a ship-to-ship or truck-to-ship bunkering is required. In this case, a bunkering truck with vent return line will be connected to the vapor return line (7) to transfer vapor from truck tank to the vent system (or vent collector) in accordance with some embodiments of the present invention. The vapor will pass through the vent collector (50) and into the vent mast riser (54) to be released into the atmosphere when the vapor exceeds the safety limit.

The pipelines include a vent mast pipeline (8). The vent mast pipeline (8) can be a separate pipeline that is connected to the pressure relief line that extends from the cryogenic tank container or it can be of the same pressure relief line that extends from the cryogenic tank container, with a portion of the relief line encased within the air-tight chamber. The vent mast pipeline (8) is provided with a pressure relief valve for releasing pressure in the cryogenic tank container (1) to the vent mast riser (54) when the pressure within the cryogenic tank container reaches a certain predetermined safe level. The gas or vapor passes through the pipeline and into the vent mast riser (54) where the gas or vapor is released into the atmosphere. The generation of vapor occurs mostly in the event when a rollover takes place or during bunkering operations, for example, when there is a change in temperature, resulting in a higher vapor pressure build up within the cryogenic tank container or the tank container is nearly full with reduced vapor space in the tank.

The pipelines further include a transfer pipeline (9) for transferring LNG or CNG from the one or more cryogenic tank containers to the engine or engine room of the tugboat. The transfer pipeline (9) can be a separate pipeline that is connected to the transfer line that extends from the cryogenic tank container or it can be of the same transfer line that extends from the cryogenic tank container, with a portion of the transfer line encased within the air-tight chamber. The transfer pipeline (9) is a double wall pipeline having an inner pipeline conduit and an outer pipeline conduit arranged concentrically to the inner pipeline conduit.

The air-tight chamber (3) may further include a liquid fuel spill drip tray (13) provided at the bottom of the air-tight chamber and within the air-tight chamber for collecting any spillage of the liquid fuel from the cryogenic tank container (1). The air-tight chamber (3) may further be provided with a liquid fuel drainage line (14) for draining spillage collected in the spill drip tray (13) out of the air-tight chamber.

A control panel (11) may also be provided to provide control to the air-tight chamber and the various components that are encased within the air-tight chamber. The control panel (11) includes a display screen (22) for displaying various readings taken by the system. The control panel may be provided at any location on board the tugboat and may take any form, size, shape and configuration without departing from the scope of the invention. FIG. 2 shows an embodiment of the control panel (11) whereby the control panel (11) and the display screen (22) are provided next to the air-tight chamber.

FIG. 4 shows another embodiment whereby the display screen (22) is provided on the front panel of the air-tight chamber.

Figure 6:
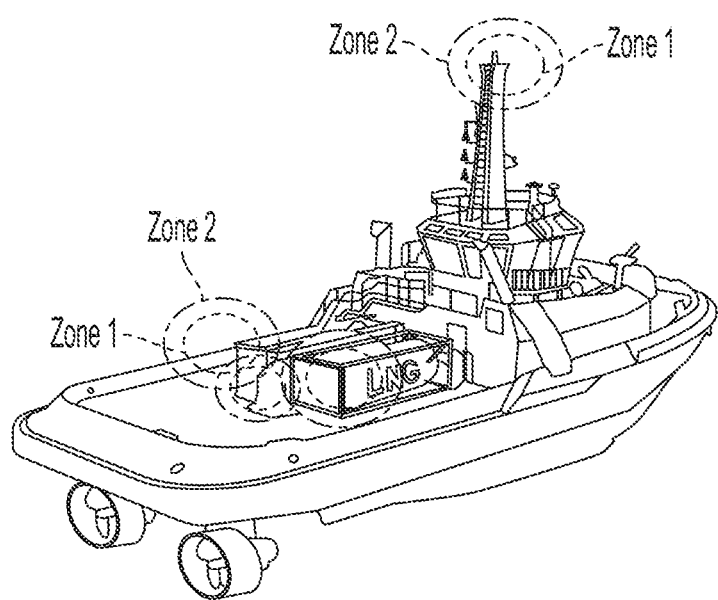
FIG. 6 illustrates the hazardous zone areas 1 and 2 of an arrangement in accordance with an embodiment of the present invention.

The arrangement in accordance with some embodiments of the present invention puts in place several features to mitigate the risks in the areas that fall within the hazardous zones of the tugboat where the cryogenic tank containers are placed. One of which is to have all the valves, gauges, vents, vent lines and pipelines encased within the air-tight chamber. This is to eliminate any spark producing equipment within the hazardous zones. In this arrangement, the hazardous zones (as shown in FIG. 6 as Zone 1 and Zone 2) are limited to the centralize area of the aft deck of the tugboat since all the related equipment, connections and pipelines are contained within the air-tight chamber and not located anywhere else on the deck of the tugboat. Zone 1 as shown in FIG. 6 has a radius of about 3 m, while Zone 2 has a radius of about 4.5 m.

Figure 19:
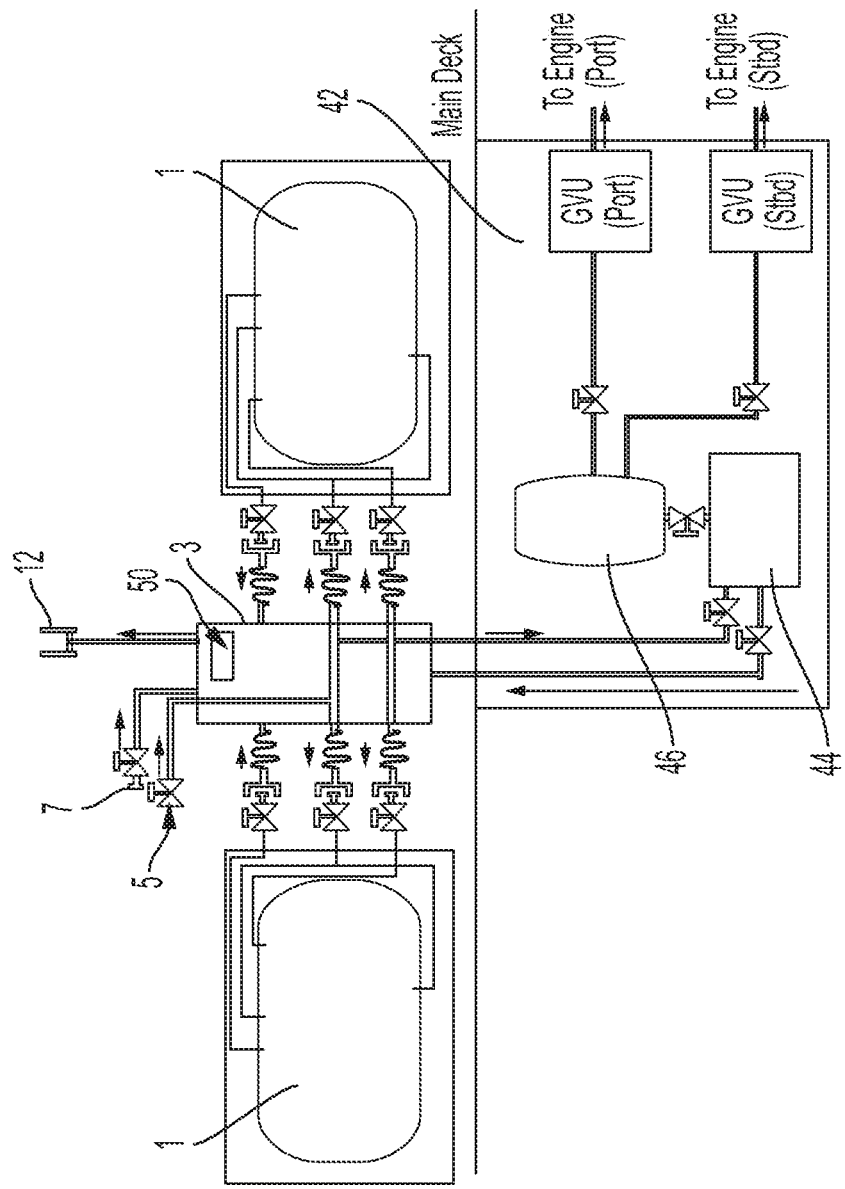
FIG. 19 is a diagram illustrating the arrangement and connections between the various components as described herein in accordance with some embodiments of the invention.

Another feature included in the arrangement in accordance with some embodiments of the present invention is the use of the double wall piping concept for transferring the LNG or CNG from the main deck of the tugboat to the engine or engine room of the tugboat which is located at an area below the main deck. In accordance with a number of embodiments where LNG is used, an LNG regasification unit (42) is provided at an area below the main deck or proximate to or in the engine room of the tugboat (see FIG. 4). The annular space in the double wall piping is ventilated by air supplied either from engine room or via the pipeline outside the engine room (away from hazardous zone). This is to ensure maximum safety in event of a gas leakage. LNG is then boiled off to be converted to its natural gaseous form through a vaporizer unit (44) at extremely high pressure. The vaporizer unit will regasify the LNG to a predetermined temperature in gaseous state. The regasified fuel or gaseous fuel then passes through a gas valve unit (GVU) to achieve a predetermined pressure before the gaseous fuel is supplied to the engine. A buffer tank (46) may be provided to store the gaseous fuel in order to maintain a constant supply of gaseous fuel to the engine of the tugboat to avoid affecting the power performance of the engine. FIG. 19 is a diagram illustrating how the various components as described herein may be connected or linked to one another in accordance with the arrangement of the system in accordance with various embodiments of the present invention.

The vaporizer unit (44) may be provided below the main deck of the tugboat or it may optionally be attached to the cryogenic tank container on the main deck of the tugboat. Each of the cryogenic tank containers may optionally be attached with a pressure build-up unit.

The arrangement in accordance with many embodiments of the present invention also caters for situation in which there is a gas leakage. In this case, the system will trigger a forced ventilation, gas detection and automatic gas supply shut-off arrangements, which will be elaborated further hereinbelow.

Figure 7:
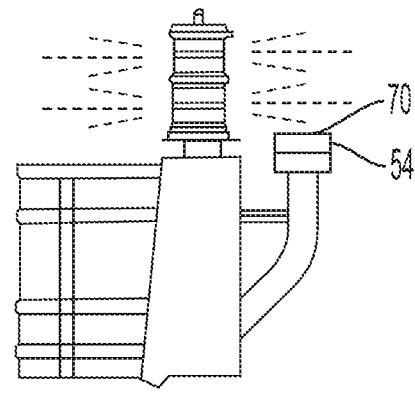
FIG. 7 illustrates a design of a vent mast riser directed to the foremast in accordance with some embodiments of the invention.

The arrangement in accordance with a number of embodiments of the present invention includes at least one vent mast riser (54) provided on the foremast of the tugboat. An embodiment of the vent mast riser (54) is shown in FIG. 7, whereby the vent mast riser has an outlet (70) that is directed to the foremast for achieving a safe distance radius of about 10 m away from accommodation space, engines and other exhaust outlets and inlets areas on the tugboat. The safe distance can be reduced to 4.5 m as long as a gas dispersion analysis is made to justify the risk and strictly abides closely with related regulations. The vent mast riser (54) is positioned such that the vent mast riser (54) does not obstruct the visibility of master in bridge nor the arc around the horizontal through which each navigation lights is supposed to shine according to regulation. Gas releasing from the vent mast riser (54) is vented vertically into the atmosphere. The main reason for having this configuration is to avoid the risk of flammable or toxic mixtures accumulating in still air condition, which may result in the gaseous mixtures being drawn into engine or machinery spaces or accommodation quarters. These vapors can be heavier than air when cold and will accumulate in bilges and other low areas. It is commonly observed that flammable or toxic gases can eddy and cause pockets of gas to collect at the most unexpected places such as the aft of the superstructure when wind blows from a forward direction. Henceforth, directing the vent mast outlet (70) as high as the foremast allows the vapors to rapidly disperse in the atmosphere vertically, especially in windy conditions. Additionally, the natural operation of a tugboat in turning and maneuvering during towing helps to avoid the accumulation of vapors in those areas.

Figure 9:
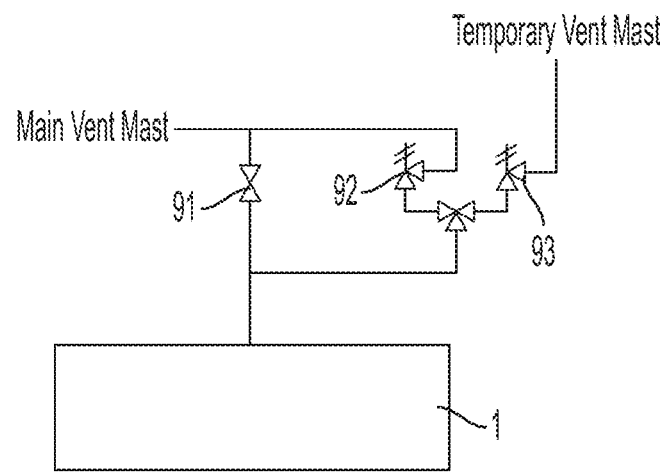
FIG. 9 illustrates an arrangement of various vent valves provided along the pipeline from the LNG/CNG tank container to the main vent mast riser and temporary vent mast riser in accordance with an embodiment of the invention.

The arrangement in accordance with some embodiments of the present invention is provided with at least two pressure relief valves (91, 92) that lead to the vent mast riser (54) (see FIG. 9). This forms a dual pressure relief device system. The pressure relief valves (91, 92) are encased within the air-tight chamber (3). A gas detector system or sensor unit (not shown) may also be provided to detect any vapor cloud that may form beyond the predetermined safety distance. The gas detector system is linked to the pressure relief device system. This enables the gas detector system to trigger a shutoff of the pressure relief valves when there is a gas leakage.

Figure 8:
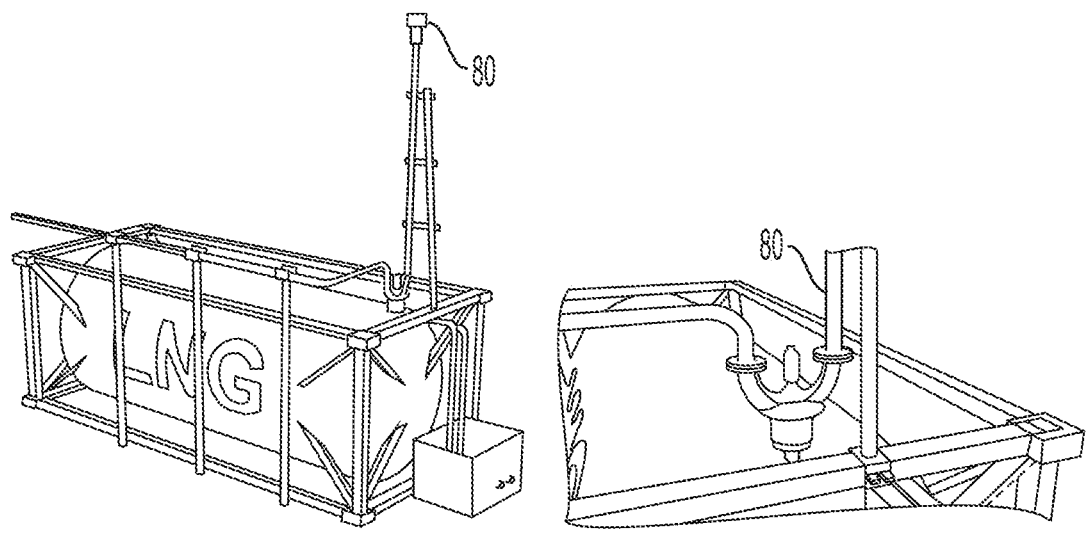
FIG. 8 illustrates a design of a temporary vent mast riser that is provided at a LNG/CNG tank container in accordance with some embodiments of the invention.
Figure 10:
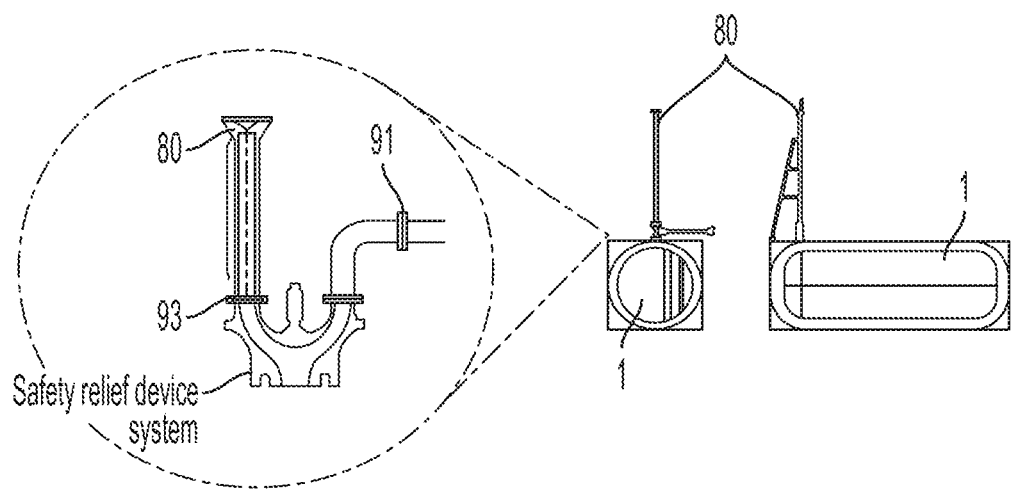
FIG. 10 shows an exploded view of a portion of the temporary vent mast rise in accordance with an embodiment of the invention.

There is a high possibility that the vent mast riser (54) may be damaged or a pipeline may be damaged due to vibration that occurs in bad sea condition or pushing operation. To countermeasure such situation, a temporary elevated vent mast riser (80) is provided and kept proximate the cryogenic tank container. FIG. 8 shows an exemplary embodiment of a temporary elevated vent mast riser (80) that is removably fixed to a cryogenic tank container. FIG. 10 shows exploded view of the lower portion of the temporary elevated vent mast riser (80) where the vent valves are located. In the event that a damage of the vent mast pipeline (8) occurs, the vapor that escapes from the damaged pipeline will be detected by the gas detector system and the system will trigger the dual pressure relief device system to shut off both the safety pressure relief valves (91, 92) and propulsion system temporarily along with sounded alarm to alert users. The pressure relief valves (91, 92) will remain closed until the temporary elevated vent mast riser (80) is fixed to the cryogenic tank container. Operation then resumes. Alternatively, the vent mast pipeline (8) may remain closed until repair work is completed. The temporary elevated vent mast riser (80) may be made of stainless steel or other equivalent material, and can be connected to and/or disconnected from the cryogenic tank container mechanically. It should be noted that the temporary elevated vent mast riser can be configured in any suitable configuration, size, and shape without departing from the scope of some embodiments of the present invention.

Figure 11:
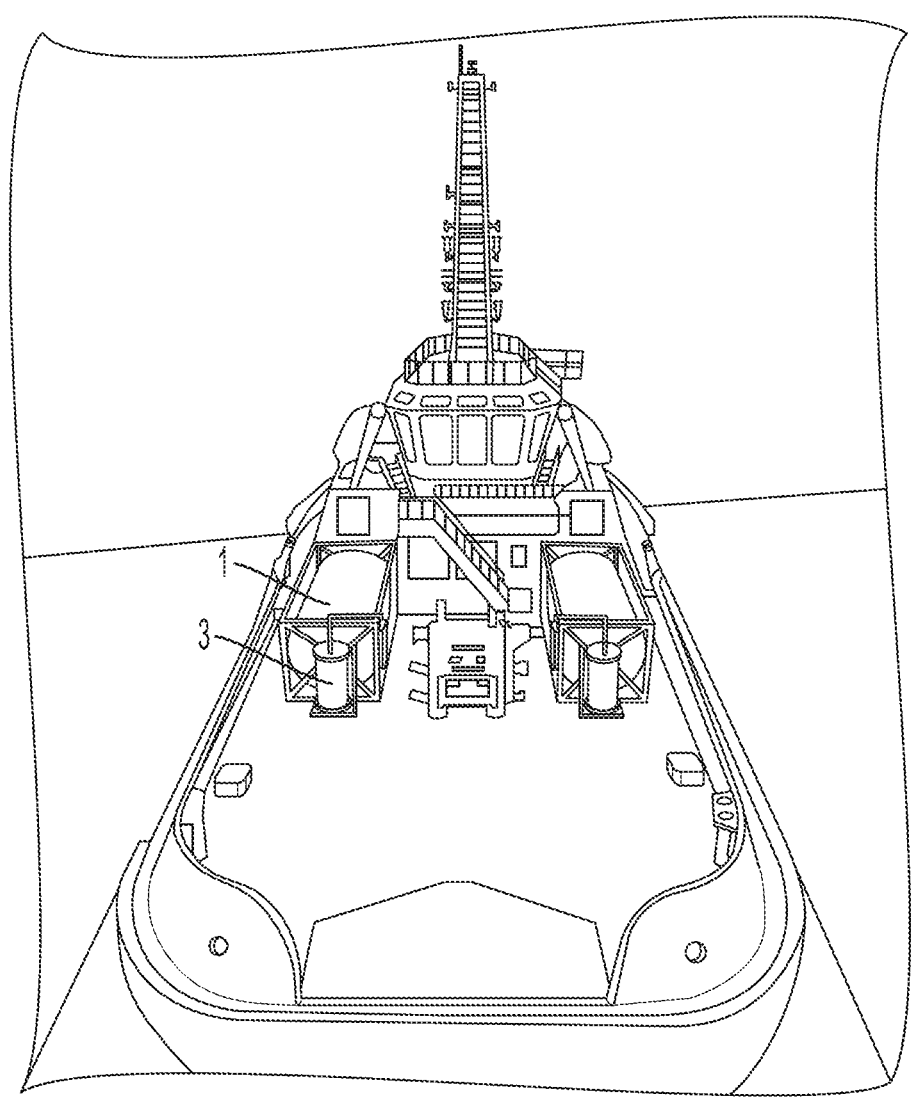
FIGS. 11-13 illustrate an arrangement of cryogenic tank containers and the air-tight chambers on and at the aft deck area of a tugboat in accordance with an embodiment of the invention.
Figure 12:
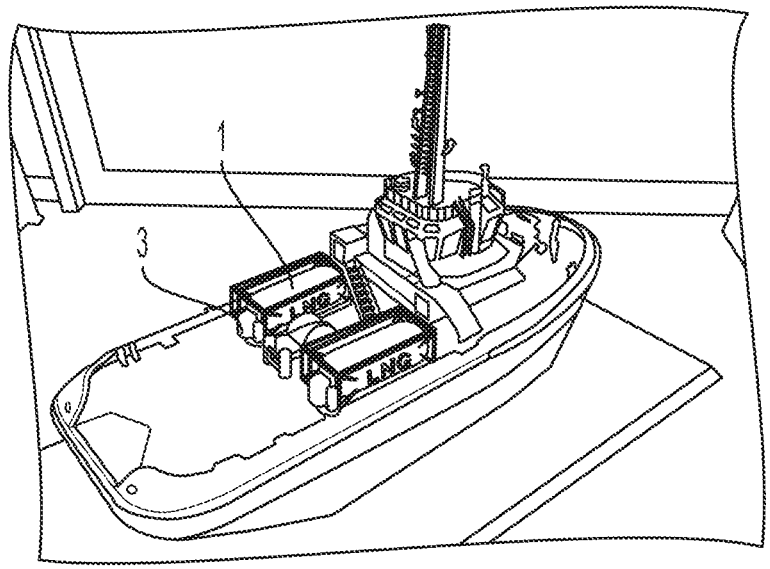
Figure 13:
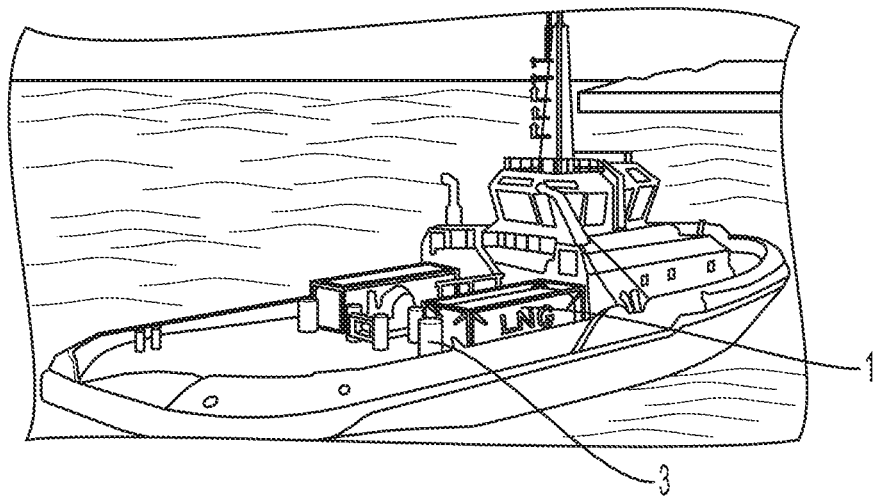

In accordance with some embodiments of the present invention, two cryogenic tank containers (1) and two air-tight chambers are provided. The two cryogenic tank containers (1) are positioned parallel to one another, with each of the cryogenic tank containers (1) connected to one air-tight chamber (3). An embodiment illustrating an example of this arrangement is shown in FIGS. 11, 12 and 13.

Figure 14:
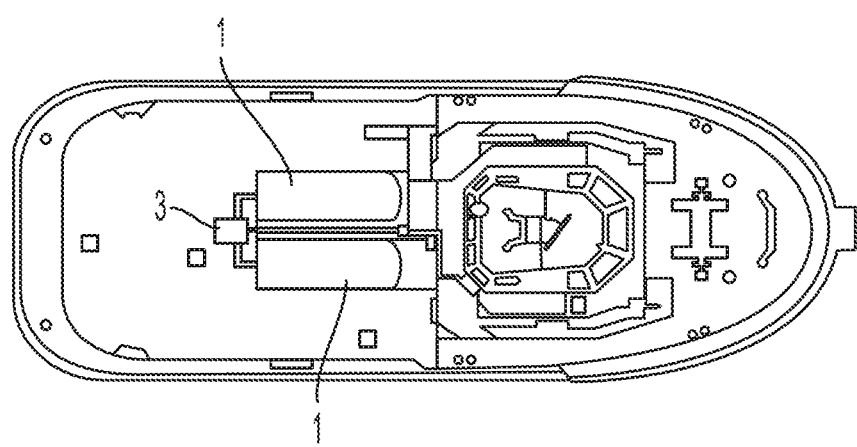
FIG. 14 illustrates an arrangement of the cryogenic tank containers and the air-tight chamber in accordance with another embodiment of the invention.

In accordance with some other embodiments, two cryogenic tank containers and one air-tight chamber are provided. The two cryogenic tank containers are positioned parallel and proximate one another, with both the cryogenic tank containers connected to the same air-tight chamber (3). An embodiment illustrating an example of this arrangement is shown in FIG. 14. It should be noted that the arrangements of the cryogenic tank containers and the air-tight chamber shown in the figures are only exemplary embodiments, and other configurations are possible that fall within the scope of various embodiments of this invention.

Figure 16:
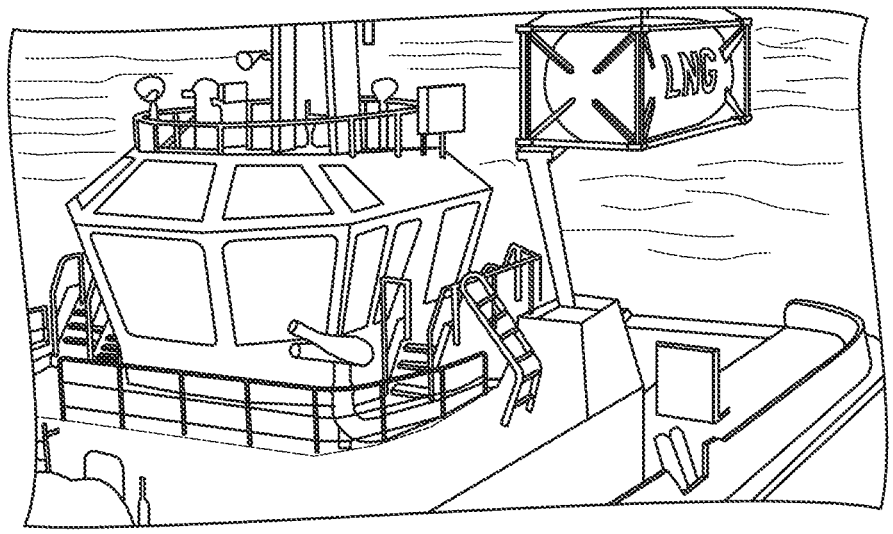
Figure 17:
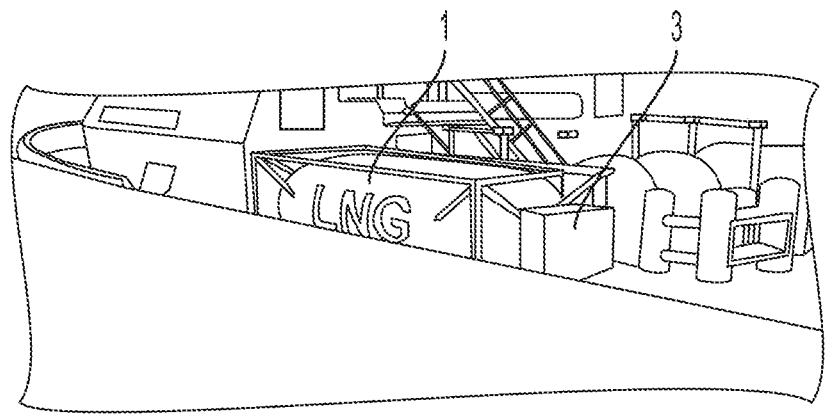
Figure 18:
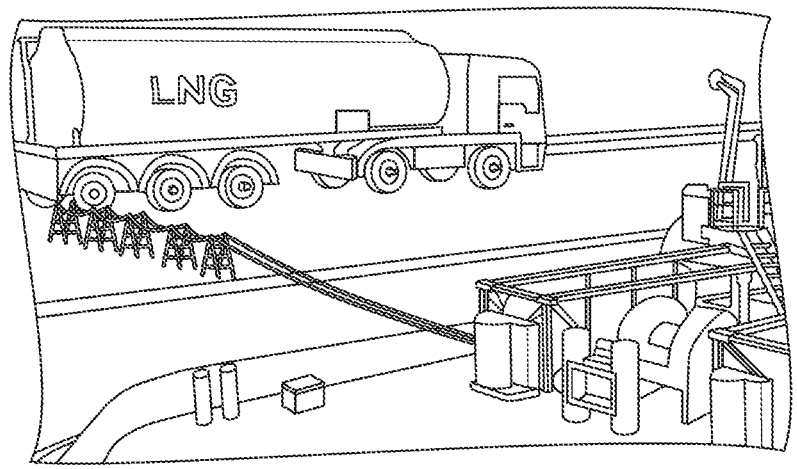
FIG. 18 illustrates the bunkering of LNG/CNG to the LNG/CNG tank container on board a tugboat in accordance with some embodiments of the invention.

In accordance with some other aspects of the present invention, a method of providing LNG or CNG as fuel to a tugboat is provided. The method comprises providing one or more cryogenic tank containers containing LNG or CNG and transferring the one or more cryogenic tank containers onto and at an aft deck area of the tugboat. The cryogenic tank containers can be transferred onto the deck of the tugboat by any suitable methods known in the art, for example, by cranes. FIGS. 15-17 illustrate an exemplary process of transferring a cryogenic tank container from shore to a tugboat using cranes. The cryogenic tank container may be transferred onto the deck of a tugboat with the LNG or CNG contained therein. Alternatively, the cryogenic tank container may be transferred onto the deck of a tugboat when the tank is empty. In this embodiment, bunkering of the LNG or CNG to the cryogenic tank container will take place after the cryogenic tank container is mounted onto the deck of the tugboat. FIG. 18 illustrates an embodiment of bunkering LNG to a cryogenic tank container mounted on board a tugboat.

As shown in FIG. 15, the cryogenic tank container (1) has a structural frame (2) surrounding the external surface of the cryogenic tank container. The structural frame (2) is provided for protecting the cryogenic tank container against mechanical damage and for facilitating the transfer of the cryogenic tank container onto the deck of the tugboat. Once the cryogenic tank container is transferred onto the deck of the tugboat, the cryogenic tank container is removably mounted on and at the aft deck area of the tugboat. Any suitable type of securing mechanism can be used to mount the cryogenic tank containers onto the deck without departing from the scope of various embodiments of the present invention as long as the securing mechanism allows the tank container to be easily replaced thereby reducing the bunkering time while providing easy access for maintenance purposes. After the one or more cryogenic tank containers are mounted onto the deck, each of the cryogenic tank containers is removably coupled to the air-tight chamber (3).

The method further includes channeling the LNG or CNG stored in the one or more cryogenic tank containers to a regasification unit (42) provided below the main deck of the tugboat. In accordance with some embodiments whereby LNG is used, the method comprises passing the LNG through a vaporizer unit (44) at extremely high pressure to convert the LNG to natural gaseous form. The gaseous fuel then passes through a gas valve unit (GVU) to achieve a predetermined pressure before the gaseous fuel is supplied to the engine.

The method may further include storing the gaseous fuel in a buffer tank (46) after the LNG is converted to gaseous form, before passing the gaseous fuel through the gas valve unit (GVU) to the engine of the tugboat. This is to maintain a constant supply of gaseous fuel to the engine of the tugboat so as not to affect the power performance of the engine.

In the event of a gas leakage, the method comprises detecting a gas leakage and shutting off the safety relief valve and propulsion system temporarily.

In the event that the vent mast riser (54) is damaged, the method comprises detecting escaped vapor and shutting off the pressure relief valves (91, 92) that lead to the vent mast riser (54); and opening an auxiliary vent valve (93) that leads to the temporary elevated vent mast riser (80) (see FIG. 9).

The arrangement of the system in accordance with some embodiments of the present invention is relatively safe as the hazardous zones on the deck of the tugboat are limited to the centralize area of the aft deck of the tugboat. The hazardous zones are kept relatively safe by having the liquid fuel related equipment, connections and pipelines arranged within the air-tight chamber. Further advantages of the arrangement and method in accordance with many embodiments of the present invention include a relatively easy method to bunker the liquid fuel as compared to ship-to shore, ship-to-ship, etc. operations, and the bunkering time is relatively shorter as compared to the conventional methods. There is no risk of liquid fuel spillage during bunkering operation and the system also requires less maintenance and operational costs. The arrangement of the system and method also minimize the hazardous operations in confined space as the fuel tanks are on the open deck of the tugboat. The arrangement optimizes the usage of spaces among accommodation, engine room, fuel system, especially on small vessels such as a tugboat. This method makes dry docking of the vessel relatively easier as the fuel tanks can be left at a safe place during dry docking of the vessel. The arrangement of the system and method of the present invention are suitable for use in places where liquid fuel bunkering facilities are far from vessel operation region or in places where liquid fuel bunkering facilities are still under development. The flexibility in the removal of the fuel tanks allows the fuel tanks to be removed if the vessel is needed to operate in a non-petroleum harbor areas where carrying dangerous cargo is restricted. The arrangement of the system in accordance with a number of embodiments of the present invention is also suitable for use in duel fuel vessels, in which the diesel tanks can be arranged within the hull and the LNG or CNG fuel tanks can be arranged on the open deck of the vessels.

The foregoing describes the invention including preferred forms thereof. Alterations and modifications as will be obvious to those skilled in the art are intended to be incorporated within the scope hereof as defined by the accompanying claims.

The invention claimed is:

1. An arrangement of a system for providing liquefied natural gas (LNG) or compressed natural gas (CNG) as fuel to a tugboat, the arrangement comprising:
   one or more cryogenic tank containers to be removably mounted on and at an aft deck area of a tugboat for storing liquefied natural gas (LNG) or compressed natural gas (CNG), each of the one or more cryogenic tank containers having a structural frame surrounding the cryogenic tank container;
   at least one air-tight chamber provided proximate to the one or more cryogenic tank containers, wherein the air-tight chamber comprises:
      a coupling for removably coupling the one or more cryogenic tank containers to the air-tight chamber;
      a plurality of vent lines and pipelines in gas or fluid communication with the one or more cryogenic tank containers;
      a plurality of valves;
      a plurality of vents; and
      a transfer line for transferring LNG or CNG from the one or more cryogenic tank containers to an engine of the tugboat; and
   wherein the one or more cryogenic tank containers are liquid-tight cryogenic tank containers and are to be removably mounted on and at the aft deck area of the tugboat by a securing mechanism that allows mounting and removal of the one or more cryogenic tank containers to and from the tugboat; and
   wherein the coupling, the plurality of vent lines and pipelines, the plurality of valves, the plurality of vents and the transfer line are encased within the air-tight chamber.

2. The arrangement according to claim 1, wherein the plurality of vent lines and pipelines include:
   a vapor return line; and
   a vent mast pipeline.

3. The arrangement according to claim 2, wherein the plurality of vent lines and pipelines further include:
   a bunkering line for connecting the one or more cryogenic tank containers to a bunker station.

4. The arrangement according to claim 1, wherein the plurality of vents includes:
   an inlet air vent for receiving air from outside the air-tight chamber; and
   an outlet air vent for releasing air from within the air-tight chamber into the atmosphere.

5. The arrangement according to claim 1, further comprising:
   a vent collector, wherein the plurality of vent lines and pipelines are housed within the vent collector.

6. The arrangement according to claim 5, wherein the vent collector is provided within the air-tight chamber.

7. The arrangement according to claim 2, wherein the vapor return line and the transfer line extends from the one or more cryogenic tank containers and into the air-tight chamber.

8. The arrangement according to claim 2, further comprising:
   a vent mast riser to be provided on the foremast of a tugboat, wherein the vent mast riser is connected to the vent mast pipeline for releasing pressure in the cryogenic tank container into the atmosphere when the pressure within the cryogenic tank container reaches a predetermined level.

9. The arrangement according to claim 8, further comprising:
a temporary vent mast riser attached to the one or more cryogenic tank containers.

10. The arrangement according to claim 1, further comprising:
a sensor unit provided proximate the one or more cryogenic tank containers for detecting escaped vapor from the one or more cryogenic tank containers.

11. The arrangement according to claim 9, wherein the plurality of valves include pressure relief valve that is provided along the vent mast pipeline that leads to the vent mast riser and an auxiliary vent valve that leads to the temporary vent mast riser.

12. The arrangement according to claim 1, wherein the arrangement comprises two cryogenic tank containers and two air-tight chambers, the two cryogenic tank containers are positioned parallel to one another, with each of the cryogenic tank containers removably coupled to one respective cryogenic tank container.

13. The arrangement according to claim 1, wherein the arrangement comprises two cryogenic tank containers and one air-tight chamber, the two cryogenic tank containers are positioned parallel to one another, with each of the cryogenic tank containers removably coupled to the air-tight chamber.

14. The arrangement according to claim 1, wherein the air-tight chamber further comprises:
a spill drip tray for collecting spillage of the liquefied natural gas (LNG) from the one or more cryogenic tank containers; and
a drainage line for draining spillage collected in the spill drip tray.

15. A method of providing liquefied natural gas (LNG) or compressed natural gas (CNG) as fuel to a tugboat, the method comprising:
transferring one or more cryogenic tank containers having a structural frame surrounding the cryogenic tank container onto an open deck of the tugboat;
removably mounting the one or more cryogenic tank containers on and at an aft deck area of the tugboat;
removably coupling the one or more cryogenic tank containers to at least one air-tight chamber, wherein the air-tight chamber comprises:
a coupling for removably coupling the one or more cryogenic tank containers to the air-tight chamber;
a plurality of vent lines and pipelines in gas or fluid communication with the one or more cryogenic tank containers;
a plurality of valves;
a plurality of vents; and
a transfer line for transferring LNG or CNG from the one or more cryogenic tank containers to an engine of the tugboat;
wherein the coupling, the plurality of vent lines and pipelines, the plurality of valves, the plurality of vents and the transfer line are encased within the air-tight chamber; and
channeling the LNG or CNG stored in the one or more cryogenic tank containers to an engine room of the tugboat.

16. The method according to claim 15, wherein the plurality of vent lines and pipelines include:
a vapor return line;
a vent mast pipeline connected to a vent mast riser; and
a bunkering line for connecting the one or more cryogenic tank containers to a bunker station.

17. The method according to claim 15, wherein the plurality of vents includes:
an inlet air vent for receiving air from outside the air-tight chamber; and an outlet air vent for releasing air from within the air-tight chamber into the atmosphere.

18. The method according to claim 16, wherein the plurality of valves includes:
a pressure relief valve that is provided along the vent mast pipeline that leads to the vent mast riser; and
an auxiliary vent valve that leads to a temporary vent mast riser.

19. The method according to claim 18, further comprising:
channeling the LNG to a regasification unit provided in the engine room below the open deck of the tugboat;
passing the LNG through a vaporizer unit at high pressure to convert the LNG to gaseous fuel; and
supplying the gaseous fuel to the engine of the tugboat through a gas valve unit.

20. The method according to claim 19, further comprising:
storing the gaseous fuel in a buffer tank before supplying the gaseous fuel to the engine of the tugboat.

21. The method according to claim 19, further comprising:
shutting off the plurality of valves when a gas leakage is detected.

22. The method according to claim 19, further comprising:
detecting escaped vapor;
shutting off the pressure relief valve that leads to the vent mast riser; and opening the auxiliary vent valve that leads to the temporary vent mast riser.

23. The method according to claim 15, wherein two cryogenic tank containers and two air-tight chamber are provided, the two cryogenic tank containers are positioned parallel to one another, with each of the cryogenic tank containers removably coupled to one respective cryogenic tank container.

24. The method according to claim 15, wherein two cryogenic tank containers and one air-tight chamber are provided, the two cryogenic tank containers are positioned parallel to one another, with each of the cryogenic tank containers removably coupled to the air-tight chamber.

* * * * *